United States Patent
Smutko et al.

(10) Patent No.: US 11,270,241 B2
(45) Date of Patent: Mar. 8, 2022

(54) SYSTEMS AND METHODS FOR DISCOVERY OF AUTOMATION OPPORTUNITIES

(71) Applicant: NICE LTD., Ra'anana (IL)

(72) Inventors: Ariel Smutko, Rehovot (IL); Aviv Yehezkel, Ramat-Gan (IL); Eran Roseberg, Hogla (IL); Yaron Moshe Bialy, Madrid (ES)

(73) Assignee: Nice Ltd., Ra'anana (IL)

( * ) Notice: Subject to any disclaimer, the term of this patent is extended or adjusted under 35 U.S.C. 154(b) by 117 days.

(21) Appl. No.: 16/440,287

(22) Filed: Jun. 13, 2019

(65) Prior Publication Data
US 2020/0394577 A1    Dec. 17, 2020

(51) Int. Cl.
    G06Q 10/06    (2012.01)
    G06Q 10/10    (2012.01)
    H04M 3/51    (2006.01)

(52) U.S. Cl.
    CPC .......... *G06Q 10/0633* (2013.01); *G06Q 10/063114* (2013.01); *G06Q 10/103* (2013.01); *H04M 3/5175* (2013.01)

(58) Field of Classification Search
    CPC combination set(s) only.
    See application file for complete search history.

(56) References Cited

U.S. PATENT DOCUMENTS

| | | | | |
|---|---|---|---|---|
| 2010/0121859 | A1* | 5/2010 | Maeda | G06F 16/2425 707/748 |
| 2015/0154526 | A1* | 6/2015 | Yates | G06Q 10/06393 705/7.39 |
| 2017/0262899 | A1* | 9/2017 | Geraghty | G06N 5/047 |
| 2018/0225583 | A1 | 8/2018 | Chen et al. | |
| 2018/0302302 | A1 | 10/2018 | Doggett et al. | |
| 2019/0007228 | A1* | 1/2019 | Vuskovic | G06F 16/00 |

(Continued)

OTHER PUBLICATIONS

Agrawal, et al., "Mining Sequential Patterns", Proceeding of the 11th International Conference on Data Engineering, 1995, pp. 3-14.

(Continued)

*Primary Examiner* — Arif Ullah
(74) *Attorney, Agent, or Firm* — Pearl Cohen Zedek Latzer Baratz LLP

(57) ABSTRACT

A system and method analyzes computer actions to identify computer-based processes (e.g. computer-user interactions) which are automation candidates. A data gathering process executed by a processor on a computer may collect low-level user action information or items, each low-level user action information or item including for example an input type description, a user name, and screen window information. At a computer sequential pattern mining may be applied to determine a set of subprocesses, each subprocess including a series of low-level user actions, each user action associated with a user action vector, and each subprocess associated with a subprocess vector generated from user action vectors associated with (typically generalized) low-level user actions comprised in the subprocess. The subprocess vectors may be grouped or clustered to create processes. For each process, an automation score may be calculated using the actions in the subprocesses in the process.

22 Claims, 8 Drawing Sheets

(56) References Cited

U.S. PATENT DOCUMENTS

| | | |
|---|---|---|
| 2019/0025851 A1 | 1/2019 | Afrouzi |
| 2019/0087691 A1 | 3/2019 | Jelveh |
| 2019/0180218 A1* | 6/2019 | Vigneswaran ... G06Q 10/06316 |
| 2019/0384657 A1 | 12/2019 | Chen et al. |
| 2020/0104169 A1* | 4/2020 | Powell .................. G06F 9/4887 |
| 2020/0125586 A1 | 4/2020 | Rezaeian et al. |
| 2020/0134488 A1 | 4/2020 | Kim et al. |
| 2020/0151826 A1 | 5/2020 | Ghaffar et al. |
| 2020/0225583 A1 | 7/2020 | Yoshida et al. |

OTHER PUBLICATIONS

Pei, et al., "Mining Sequential Patterns by Pattern-Growth: The PrefixSpan Approach", IEEE Transactions on Knowledge and Date Engineering, 2004, 16-11, pp. 1424-1440.

Xu, et al., "Analysis of Web Access Sequence Based on the Improved PrefixSpan Algorithm", International Industrial Informatics and Computer Engineering Conference, Mar. 2015.

Saputra, et al., "Mining Sequential Patterns Using I-PrefixSpan", World Academy of Science, Engineering and Technology, 2007.

https://www.kryonsystems.com/process-discovery/, printed on 2019.

Marufuzzaman, Mohd, and Mamun Bin Ibne Reaz. "Hardware simulation of pattern matching and reinforcement learning to predict the user next action of smart home device usage." World Applied Sciences Journal 22.9 (2013): 1302-1309. (Year: 2013).

Agrawal et al., "Mining Sequential Patterns", Proceeding of the 11th International Conference on Data Engineering. CA: Los Alamitos, IEEE Computer Society, pp. 3-14, 1995.

Deisenroth et al., "PILCO: A Model-Based and Data-Efficient Approach to Policy Search", In Proceedings of the 28th International Conference on machine learning (ICML-11), pp. 465-472, 2011.

Kyron, "Automated Business Process Discovery", retrieved Sep. 6, 2019 from https://www.kryonsystems.com/process-discovery/.

Mnih et al. "Human-Level Control Through Deep Reinforcement Learning", Nature, 518(7540), pp. 529, 2015.

Pei et al., "Mining Sequential Patterns by Pattern-Growth: The Prefixspan Approach", IEEE Transactions on Knowledge and Date Engineering, 16(11 ), pp. 1424-1440, 2004.

Saputra, "Mining Sequential Patterns Using 1-PrefixSpan", Proceedings of World Academy of Science, Engineering and Technology, vol. 26, ISSN 1307-6884, pp. 499-504, Dec. 2007.

Van Hassel T et al., "Deep Reinforcement Learning with Double Q-Learning", Proceedings of the Thirtieth AAAI Conference on Artificial Intelligence (AAAI-16), pp. 2094-2100, 2016.

Xu et al., "Analysis of Web Access Sequence Based on the Improved PrefixSpan Algorithm", International Industrial Informatics and Computer Engineering Conference, pp. 788-791, 2015.

* cited by examiner

| AUTOMATION PORTAL | | | | glo ∨ ⟲ | |
|---|---|---|---|---|---|
| Automation Insights > nrs workflow services Inc: mozilla firefox participant search > | | | | | |
| User 1 510 | 520 | 530 | 540 | 550 | 560 |
| ACTION | START TIME ▲ | ACTION COMPONENT | WINDOW | APPLICATION | TEXT |
| Input Text | 13:24:38 | Desktop | Program Manager | explorer | |
| Left Click | 13:24:40 | Notes/Index Errors | NRS Workflow | jp*launcher | |
| Left Click | 13:24:42 | NRS Workflow | NRS Workflow | jp*launcher | |
| Left Click | 13:24:43 | Reassign | NRS Workflow | jp*launcher | |
| Input Text | 13:24:43 | Reassign | NRS Workflow | jp*launcher | Text |
| Left Click | 13:24:43 | Reassign | NRS Workflow | jp*launcher | |
| Double Click | 13:24:51 | Search Participant | NRS Workflow | jp*launcher | |
| Left Click | 13:24:52 | Search | Services Inc; Participa... | firefox | |
| Left Click | 13:24:57 | Search | Services Inc; Participa... | firefox | |
| Right Click | 13:25:01 | NRS Workflow | NRS Workflow | jp*launcher | |

FIG. 5

SYSTEMS AND METHODS FOR DISCOVERY OF AUTOMATION OPPORTUNITIES

FIELD OF THE INVENTION

The present invention relates generally to analysis of computer usage; in particular analysis of computer usage in order to discover processes which may benefit from automation.

BACKGROUND OF THE INVENTION

Companies and organizations such as call centers, or other businesses, may identify ("discover") business processes or "flows" that are significant candidates for automation, in that they are both feasible for automation and that automation would have high potential return on investment ("ROI") by saving significant manual efforts and workloads when being handled by automated computer processes, "bots", or robots instead of human agents. Such automation opportunities may involve human-computer interactions. A bot created to replace or automate human-computer interactions may be an autonomous program that may interact with computer systems, programs, or users, and which may operate as would a human user.

Today, this discovery and analysis process is typically manual, which is far from being optimal. This may be because automation of identified flows may be difficult to justify (in terms of profitability and automation ROI); (b) not all processes or flows may be found manually and other, more significant, flows can be easily missed; and (c) the manual discovery process is biased, time consuming and very expensive.

Various methods exist, machine based, human based, and machine-human hybrids, to find automation opportunities. For example, a human analyst may sit next to an agent operating software and note which tasks the agent performs using the computer have opportunities for automation. Technologies exist to attempt to automate this process, at least in part. Technologies such as process mining tools may use high-level system-specific event logs as input data, such as case identification (ID) (e.g. "Process ID"), activity ID and, timestamp to identify automation opportunities. A case ID may identify the process instance and an activity ID may specify the task that has been performed as part of the process. Such data is typically provided by the application itself, and may not be provided for all applications, and thus any such process may work with incomplete data. Data such as an activity ID, user selection and input may be data internal to a program, and may not be provided to other programs. No current process is capable of using accessible low-level desktop events as input data; such low-level data may not be associated with a specific process (e.g. case ID) but rather may be associated only with a window and a program operating the window (e.g. an internet browser). Since the use of low-level input data may make the problem of identifying significant processes for automation much harder, current processes typically do not use low-level input data.

Some current methods require analysis to be performed by human reviewers of data, by manually searching for possible sequences of actions in input data, which depending on the data may contain millions of actions and thousands of sequences. To find all candidates, a human reviewer may need to perform the labor-intensive tasks of finding all various actions in input data, and reviewing the data. Such a manual process may require impractical human processing time, and use a large amount of computer memory. This is, as a practical matter, impossible to be performed by a human.

In addition, tasks identified in prior art methods may not be the best tasks for automation—for example be low volume or low frequency, resulting in low automation ROI.

SUMMARY OF THE INVENTION

A system and method may analyze computer actions or received user input on a computer desktop system to identify computer-based processes (e.g. computer-user interactions on a desktop or graphical user interface (GUI)) which are automation candidates. A data gathering process executed by a processor on a computer of one or more computers may collect or gather low-level user action information or items, each low-level user action information or item including for example an input type description, a user name, and screen window information. At a computer sequential pattern mining may be applied to determine a set of subprocesses, each subprocess including or associated with a series or sequence of low-level user actions, each user action associated with a user action vector, and each subprocess associated with a subprocess vector generated from user action vectors associated with low-level user actions comprised in the subprocess. The subprocess vectors may be grouped or clustered to create processes. For each process, an automation score may be calculated using the actions and their instances in the subprocesses in the process.

By using low level event data (e.g. describing user actions), embodiments of the present invention may be agnostic to the different enterprise or other applications used and providing input, and may not require integrations to or knowledge of a number of applications. Embodiments may provide a realistic and detailed understanding of a user's actions by using low-level input data. Embodiments of the present invention may use new processes to use low-level input data to identify significant processes for automation.

Embodiments of the invention may work without high-level system-specific event logs and may instead use low-level user input data, without being associated (e.g. directly associated via a case ID) to activities or process instances. Prior art data gathered and analyzed focuses on a high-level view, e.g. the level of a step-in-business-process but prior art processes do not and cannot take into the account the actual actions a user takes in order to complete a specific step in a process. For example, high-level system specific event logs used in prior art processes may include a case ID which may specifically identify the process or program instance, e.g. a number, and an activity ID (e.g. a unique identifier of each activity in a process) which may specify or identify the task that has been performed by a user or a computer system. In contrast, the low level event data recorded and used in embodiments of the present invention may not be associated with a specific process (e.g. case ID) or activity but rather may be associated only with a window which has a name and with a program or application operating the window (e.g. an internet browser). The title (e.g., the label displayed at the top) of the screen window, and the name of the program executing with which the user is interacting are data may be extracted or obtained and is different from, the specific identification of the process or program instance which in some cases may not be obtained. Event log data such as an activity ID may be data internal to a program, and may not be provided to other programs; in contrast data such as window names may be more accessible and agnostic to the various programs and applications.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5 is an example of information collected and assigned to a subprocess according to embodiments of the present invention.

Figure 1A:
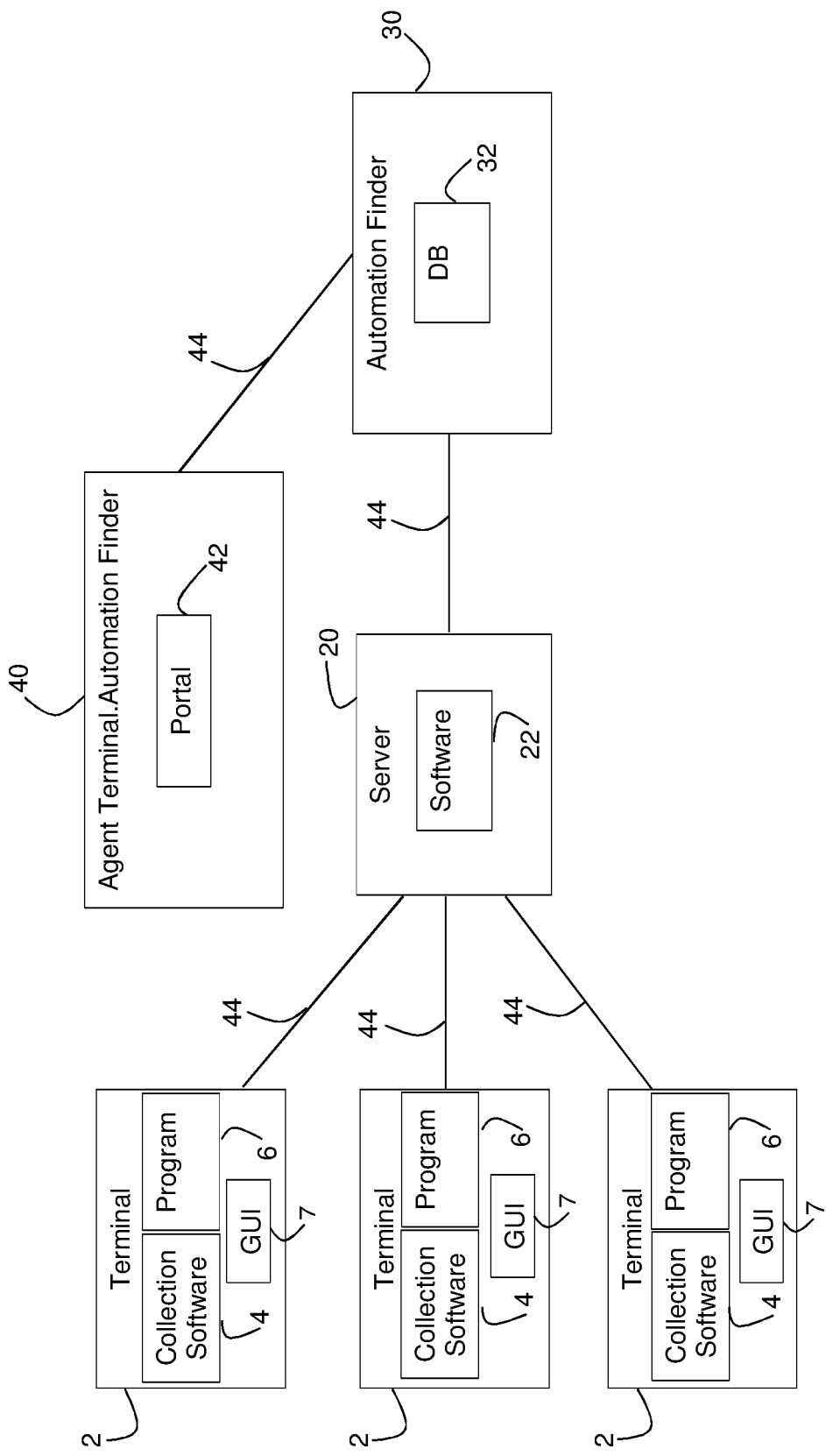
FIG. 1A is a block diagram of a system for discovering automation opportunities according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may analyze data (e.g. low-level user action information items) describing actions of human-computer interaction, such as user input events to a GUI. In such a manner—analyzing only user input events and their context—a broad set of data may be gathered, more than with prior art processes. The data may be analyzed to identify computer-based processes which are automation candidates, e.g. which may be replaced by an automatic process such as a bot or robot. In one embodiment data is gathered or received from multiple physically distinct user terminals operated by multiple different users, and is analyzed at a central location or server not at any of the user terminals (typically be a processor separate from terminal processors); however the data analysis discussed herein may be performed at a user terminal which also collects user data. At for example a central server data received from the terminals describing the low-level user action information or items may be used to determine subprocesses, which may be for example a series of actions that repeat across the data, and possibly repeat across data divided into contexts. An item of information describing or defining a low-level user action may include for example an input type description (e.g. the type of action the user performed as input: mouse click, left click, right click, cut, paste, typing text, etc.), a user name, and screen window information such as title or name. (E.g., as computer processes in this context may be displayed as windows, each window may have a title or name which may describe the user-facing application to which the user provides input.) Actions may be stored and identified both identifying the specific unique (within the system) instance of the action, and also a generalized name or description that identifies the action in a way such that actions of similar functionality will have the same generalized name. Both the specific and generalized identification or name may be linked or stored together in the system. Sequential pattern mining may be applied to determine subprocesses, each subprocess including a series of low-level user actions which are reoccurring in the data.

Subprocesses may be grouped or clustered by for example representing each subprocess as a vector and clustering or grouping the vectors. Each user action may be associated with or represented by a user action vector, and by extension each subprocess may be associated with a subprocess vector which may be calculated or generated from user action vectors associated with low-level user actions in the subprocess. The subprocess vectors may be grouped or clustered to create processes, which may be considered a task such as a business task that may be large enough and otherwise suitable for automation. For each process, an automation score may be calculated for example using the actions in the subprocesses in the process. Based on this score, a user may create an automation process such as a bot which may automatically—e.g. via computer function—complete the process which previously was performed by a person interacting with a computer.

Figure 1B:
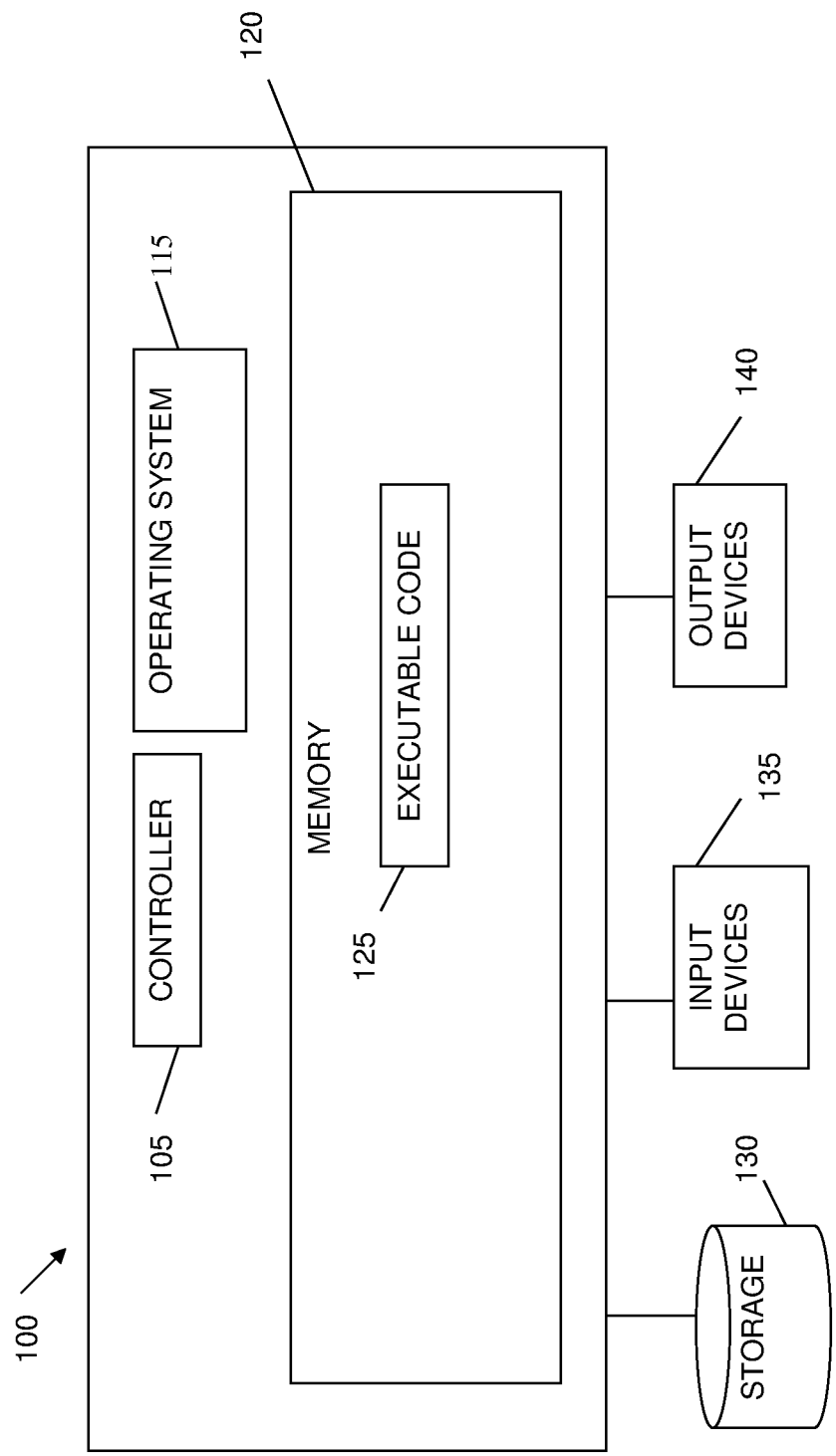
FIG. 1B is a high-level block diagram of an exemplary computing device which may be used with embodiments of the present invention.

FIG. 1A is a block diagram of a system for automation discovery according to an embodiment of the present invention. While FIG. 1A shows such a system in the context of a contact center, embodiments of the invention may be used in other contexts. A number of human users such as call-center agents may use agent terminals 2 which may be for example personal computers or terminals, including components such as shown in FIG. 1B. Terminals 2 may include one or more software programs 6 to operate and display a computer desktop system 7 (e.g. displayed as user interfaces such as a GUI). In some embodiments, software programs 6 may display windows, e.g. via desktop system 7, and accept user input (e.g. via desktop system 7) and may interface with server software 22, e.g. receiving input from and sending output to software programs 6. Programs 6 may be executed by or on terminals 2 and server software 22 may be executed by server 20, and software 22 and programs 6 may interact in a client-server manner.

Client data collection software 4, e.g. the NICE RT™ Client software or NICE Attended Robot provided by NICE, Ltd., may execute on or by terminals 2 and may monitor input to programs 6. For example client data collection software 4 may receive, gather or collect a user's desktop activity or actions, e.g. low-level user action information or descriptions, and send or transmit them to a remote server 20, e.g. a NICE RT™ Server. Client data collection software 4 may access or receive actions via for example an API (application programming interface) interface with the operating system and/or specific applications (e.g. the Chrome browser) for the computer or terminal on which it executes. Remote server 20 may collect or receive data such as user action information or descriptions, combine actions into a file, and export them as for example JSON (JavaScript Object Notation) files via for example an HTTPS (Hypertext Transfer Protocol Secure) connection to an automation finder processor 30, which may receive and store action data and other data in a database 32.

In some embodiments server 20 and automation finder processor 30 may be contained in the same computing device, unit or server, and finder processor may include a processor (e.g. as shown in FIG. 1B) separate from a processor executing collection software 4. A user such a person designing or creating automation software may use an agent terminal 40 which may be for example personal computers or terminals, including components such as shown in FIG. 1B. Agent terminal 40 may direct or control an automation finder process executing at automation finder processor 30, and may display output of automation findings, as for example shown in FIGS. 5-7, using for example an interface such as an automation finder portal 42 executed by finder processor 30 and/or agent terminal 40. One or more networks 44 (e.g. the internet, intranets, etc.) may connect and allow for communication among the components of FIG. 1A.

Terminals 2 and 40 may be or include computing or telecommunications devices such as personal computers or other desktop computers, conventional telephones, cellular telephones, portable or tablet computers, smart or dumb terminals, etc. Terminals and servers 2, 20, 30 and 40 may include some or all of the components such as a processor shown in FIG. 1B.

In one embodiment, client data collection software 4 may operate with permission of the organization operating terminals 2, and may collect for example user input event data, and may be tuned or configured to not collect certain data. For example a user may configure data collection software 4 to operate on or collect data from only certain windows and applications (e.g. windows with certain titles, or certain URLs (uniform resource locators) or website addresses), and may ignore for example windows accessing certain URLs or website addresses. Client data collection software 4 may collect data from Internet based windows and/or non Internet based windows.

FIG. 1B shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment such as terminals 2 and 40, server 20, data collection software 4, software programs 6, server software 22, automation finder processor 30 and automation finder portal 42 and other modules discussed herein may be or include, or may be executed by, a computing device such as included in FIG. 1B, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as low level action data, output data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2 and 4, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 1B may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
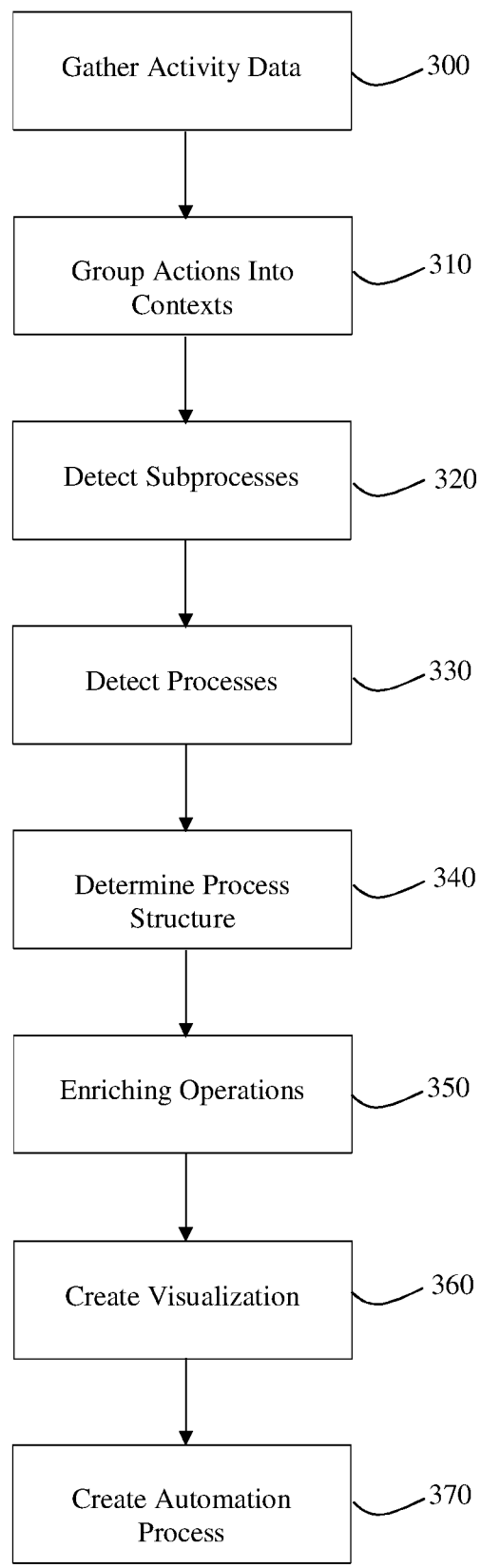
FIG. 2 is a flowchart of a method according to embodiments of the present invention.

FIG. 2 is a flowchart of a method according to embodiments of the present invention. While in one embodiment the operations of FIG. 2 are carried out using systems as shown in FIGS. 1 and 2, in other embodiments other systems and equipment can be used.

Referring to FIG. 2, in operation 300, a data gathering process (e.g. client data collection software 4, such as the NICE RT Client produced by NICE, Ltd.) executed on or by a user or agent terminal such as terminal 2 (e.g. a computer as shown in FIG. 1B) may receive or gather computer or use activity data describing or related to low-level user action information or descriptions, e.g. displayed on and input to a computer desktop system. A low-level user action may refer both to the action itself, typically input by a user received by a computer, and the data that describes such an action, and in addition a generalized description or name for the action which applies to multiple specific instances of the same action or similar ones (in terms of their functionality). A specific set of data describing a low-level user action may be termed a low-level user action item.

A low-level user action or low-level user action item may be for example a mouse or other pointing device click, a keyboard input to a text field, a cut command, a paste command, a certain keystroke or set of keystrokes (e.g. ctrl-P, alt-F1, etc.). Data describing such user actions (e.g. a low-level user action item) may include for example the type or description of action item or an input item description (click, cut, paste, text entry, etc.); action component details (e.g. the title of window item to which input is applied, e.g. the name of the text field having text entered; the title of the button or control being clicked on, etc.); a user name or ID (e.g. the name of ID of the person providing the input or logged in to the computer or terminal); a time or timestamp of the action; screen window information such as the title of the screen window into which data is entered or on which the relevant data is displayed, and the name of the program or application executing with which the user is interacting (e.g. the program displaying the window such as the Internet Explorer browser).

A window may be for example a defined sub-area of the screen which may typically be resized and moved by a user, in which data is displayed and entered for a particular task or software program. For the point of view of the computer by which a window is displayed, a window may be a graphical control element including a visual area with a graphical user interface for the program it belongs to, typically rectangular. A window typically has a name displayed, typically at its top—for example, a window allowing a user to edit a text document may have a name or title including the filename of the document and the program being used to edit the document. A window may be related to two different software programs: the name of the program or application executing the window, such as a browser such as Internet Explorer; and a remote or local program which controls or owns the substance of the window. The local or remote program executing the substance of the window may not provide adequate data, and thus embodiments may capture low level action data instead. In many cases, the name or title for a window may be accessible from the OS of the computer executing the program owning or displaying the window, while the program owning or displaying the window may not allow or provide access regarding its own name, function etc. via system-specific event logs.

Low-level user action information or description data (e.g. user action items) may be for example stored and/or transmitted to for example a server or other computer such as server 20. In one embodiment, data collected may be in the form of Windows Handles and their properties as provided by Windows API (e.g. Win-32). The event logs files describing these data collected desktop events collected by NICE RT Client may be exported using JSON files to server 20. Other low level event or action data may be used. The data may include for example event or action time (e.g. start time, but end time may also be included); user details (e.g. name or ID of the person providing the input or taking the action in conjunction with the computer); action details or description (e.g. mouse-click, text-input, keyboard command, etc.); the details of the window in which the action takes place, such as the window size, window name, etc.; the name of the program executing the window; and text if any that was input or submitted (in text actions). Other or different information may be collected. User details or ID may help to tie together actions to related processes and infer process orderings.

Each low-level user action may be described in a database by several fields of the action data such as action time, user details, action details, window name and size, program executing the window, and whether or not text was entered. A generalized name or description may also be created and associated with the action, where the generalized name has certain specific information such as user ID, timestamp, and other tokens in the data (e.g., names, dates, etc.) removed or replaced with generalized information. Multiple specific instances of similar actions may share the same generalized name or description. Thus actions may be stored and identified by both identifying the specific unique (within the system) instance of the action, and also a generalized name or description.

Table 1 below depicts example action data for an example scenario in which the agent logs in into an ordering system; as with other data used in examples other specific data and data formats may be used. The agent may open or start the ordering system, enter her or his username and password in a login screen, and then continue working on a case e.g., move to the new orders screen. This includes several low-level user actions as described in Table 1. First, the agent, identified as Agent1 in the User column, at time 10:00:00, clicks twice using a mouse left-click on the MyOrderingSystem icon on the desktop display (window Desktop indicates the desktop on a Windows style system, where windows may be displayed on the desktop). The login screen or window may open or pop up (named per collected data MyOrderingSystem-Login), and the agent may enter his username (e.g. "Agent1") and password (e.g. "myPassword") into the fields identified in the Action column, and successfully logs in. The text collected as data may be the entered agent name and password. The agent may then click on mouse left-click on the NewOrders view inside the MyOrderingSystem to display new orders.

TABLE 1

| User ID | Time | Window Name | Action Description or Type | Text Entered |
|---|---|---|---|---|
| Agent1 | 10:00:00 | Desktop | Left-Dbl-Clickon MyOrderingSystem | |
| Agent1 | 10:00:10 | MyOrderingSystem-Login | InputText on Username | Agent1 |
| Agent1 | 10:00:20 | MyOrderingSystem-Login | InputText on Password | myPassword |
| Agent1 | 10:00:30 | MyOrderingSystem-MainView | Left-Click on NewOrders | |

In operation 310 low-level user actions may be grouped into or assigned to contexts, which may be for example a rough assignment of the business process or other functionality executed by the user while taking the associated action. This may be performed for example by applying a statistical algorithm, possibly using window information, e.g. the title of the window in which the action occurs or is entered. A context may be considered a contained process which includes subprocesses and actions. A subprocess may be a sequence of low-level actions, executed again and again (with different specific timing and/or user data in each instance), which share or occur in the same context. A context may be derived from window names in which user actions take place, in contrast with a subprocess which may be derived from a series of low-level actions repeated across specific instances of user interaction. Some embodiments may determine or identify one or more process contexts from the series of low-level user actions. An embodiment may be domain-agnostic and language-agnostic. A statistical-learning, TF-IDF (term frequency-inverse document frequency) based approach may be used, determining or creating a context according to frequent words in the window names used by the user (e.g., the screens that were used by the specific user during his work), but also dropping or not including "too-frequent" words (e.g. that appear too-frequently, e.g., in a high-fraction of the entire user actions data, across multiple users, as opposed to screens used by a specific user). In one embodiment, a context may be identified by analyzing the window names, for example, using the procedure:

Context(sentence)={word if freq(word, sentence)>thresh_1 AND freq(word,data) <thresh_2|word∈screens(sentence)}

Where, for each "sentence", which may be the window titles names and the name of the program or application for a group of instances of actions which occur within a time window or time band, a context for that sentence is found. The relevant timestamp used for each action is typically start time, although start and end time may be used. A number of time-sequential sentences or groups of actions may be defined by action start time within the time band or time period, where the sentences or groups are typically not overlapping. The process described by Context(sentence) may be performed iteratively once for each sentence. Context(sentence) may be a textual sentence, e.g. a string which is a concatenation of words, describing the context for the group of actions having their associated window names in the group "sentence". freq(word, sentence) may be the frequency, e.g., number of appearances of a "word" in the group "sentence". freq(word,data) may be the frequency, e.g., number of appearances of, "word" in the window names for all actions in the data set of action input data. thresh_1 and thresh_2 may be the TF-IDF thresholds, e.g.

integers. screens(sentence) may be all the screen names in this group "sentence", namely, the screen names of all actions in the group defined by a certain time window.

A word may be a text string that is returned as a Context if its frequency "freq" (e.g. number of occurrences) across the screen name data in a sentence is greater than a threshold thresh_1 and if its frequency when used across all action data (across all contexts) is less than a number of occurrences thresh_2. Typically, sentence data over which a word is search is sentence data for each particular instance of an action for a specific user.

For example, a user may take action in or use the following example screens or windows, with the first item in the pair being the name or title of the window or screen, and the second item in the pair being the name of the application or program owning the window (e.g., a "ServiceNow" application, internet browser such as Internet Explorer). The screen name information for the following actions may be used, where the actions are defined as being in the same sentence based on timestamp within a defined period or range:

Accounts, Passwords XYZ; Permissions|ServiceNow-Internet Explorer

Locked Account or Password Reset|ServiceNow-Internet Explorer

Request to reset domain (computer) password|ServiceNow-Internet Explorer

Other data or data formats may be used, as with other example data shown herein. XYZ may be a name or application or program name related to a specific entity or organization creating or operating the applications being analyzed. The above-described algorithm may identify or determine that the process context is "reset password", and the too-general (and probably too-frequent) "Service Now" and "Internet Explorer" terms may be removed. "Reset password" may be returned as being the two words that occur frequently within the window title information for the three actions used above, and which do not occur frequently across all window title information for all actions, across all users and all times (each sentence may be related to an action by a specific user at a specific time).

In operation 320 subprocesses may be detected within the set of low-level user actions; in some embodiments this may be done for each context. This may be performed for each context: e.g. within each context a number of subprocesses associated with that context may be discovered or defined. For example, each sentence (e.g. groups of specific instances of actions having start timestamps within a time window) may be assigned to a context, and the actions for sentences within a context may be used to define subprocesses for that context (typically ignoring sentence boundaries or divisions when subprocesses are found). A subprocess may be considered to be a common reoccurring sequence of actions, e.g. a series, possibly a time-ordered series or sequence, of low-level user actions which occurs multiple times across the dataset, but which may be detected as sharing the same context, e.g. the same series sequence of actions (typically using different specific data at least in their original, as-gathered, representation) recurring in different places. When finding subprocesses, the generalized names (e.g. with some features identifying the action instance such as user ID or timestamp removed) of actions may be considered.

Figure 3:
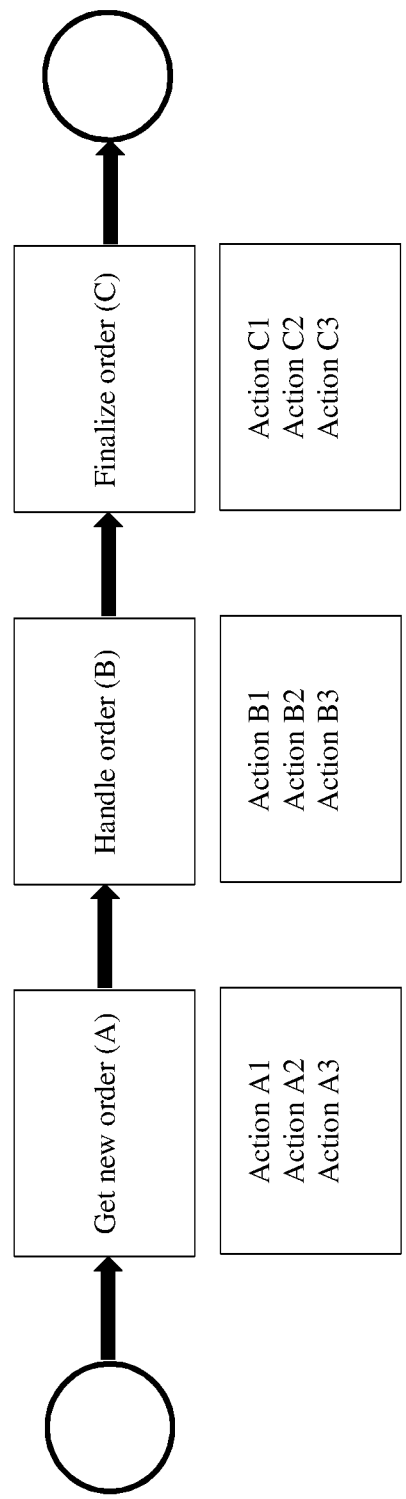
FIG. 3 is an example of a process including subprocesses according to embodiments of the present invention.

FIG. 3 is an example of a process including subprocesses according to embodiments of the present invention. In FIG. 3, an order handling process includes subprocesses (A), (B) and (C), each including low-level user actions.

In one embodiment, a modification of a sequential pattern mining algorithm (e.g. the known PrefixSpan algorithm) may be used to identify or determine, for each context, a set of subprocesses. Such algorithms may implement a bottom-up approach: action sequences of length 1 are found; then the algorithm continues iteratively such that the K-step begins with the (K−1)-length sequences that have passed a support-threshold threshold (namely, a minimum frequency threshold) and searches for sequence candidates of length K.

In some embodiments, instead of finding all the candidates in each iteration by scanning the data, an algorithm such as the PrefixSpan algorithm may find all the candidates at first place and then recursively pass through them until all the sequences are found. For example, four example action sequences are provided in Table 2 below. In Table 2, actions may be identified using their generalized names, such that action b (in typical use a generalized name is a string) occurring twice means that a first specific instance of an action occurred and a second instance occurred, where both instances have the same generalized name or description. Specific instances of actions may be ordered by timestamp and represented by a generalized name.

TABLE 2 a b c d e
b b b d e
c b c c a
b b b c c

An algorithm may identify, for example, the sequence c-c of length 2, which repeats itself twice and the sequence b-c which repeats three times. The PrefixSpan algorithm may return the complete set of sequences and their respective support (e.g. number of occurrences). One embodiment provides a modification to this inefficiency of the PrefixSpan algorithm to achieve an optimal resources-results tradeoff.

Figure 4:
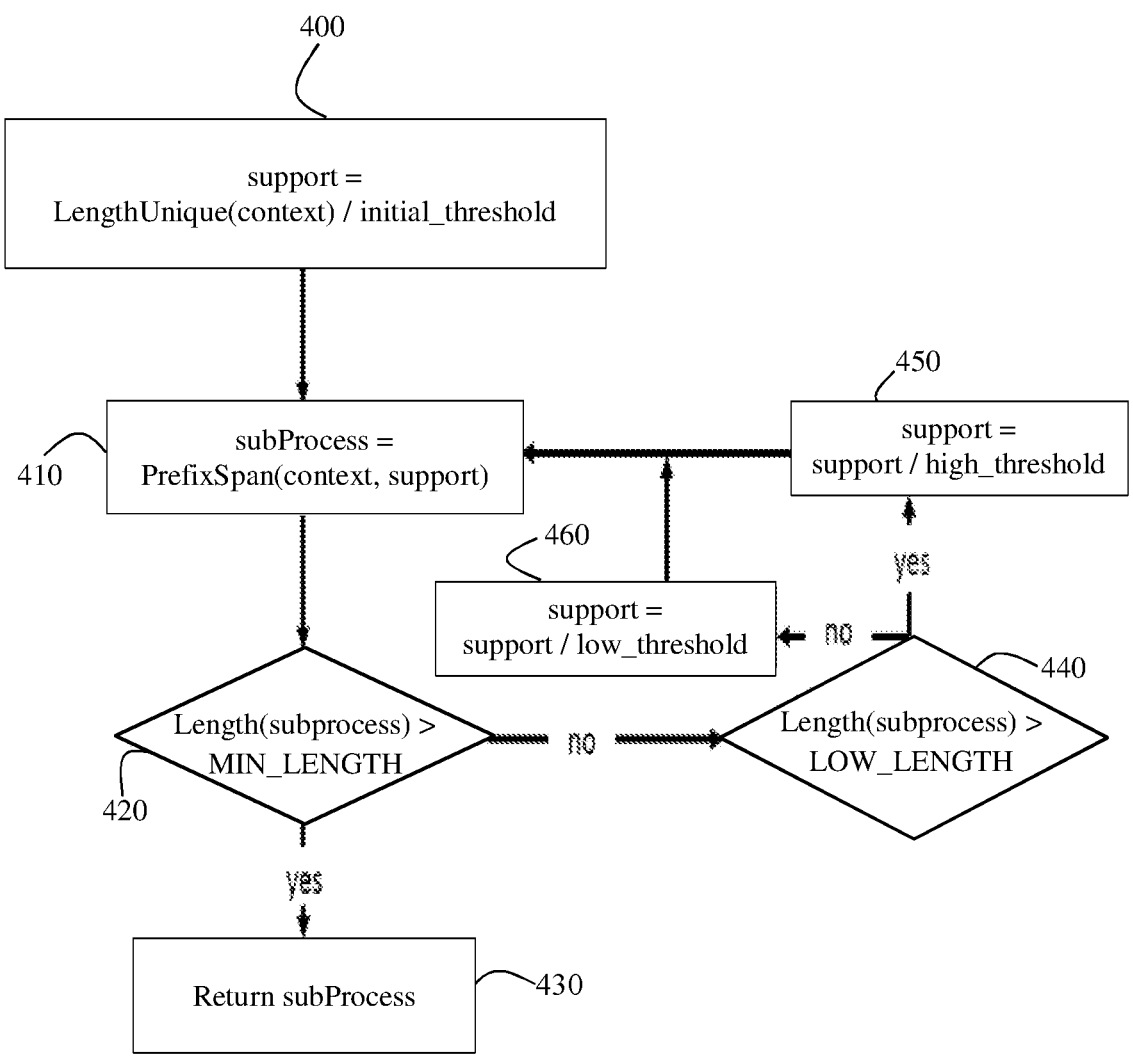
FIG. 4 is a flowchart of a method according to embodiments of the present invention.

FIG. 4 is a flowchart of a method according to embodiments of the present invention, which may for example be actions performed in operation 320 of FIG. 2. The example operations of FIG. 4 may be performed for each of a set of different contexts, for example those contexts identified or determined in operation 310. In FIG. 4, a process such as PrefixSpan may be executed using dynamically-tuned values of support (e.g., minimum frequency), to find zero, one, or multiple subprocesses for a context. An algorithm may begin searching with an initial support, and tune or adjust this value according to the number of found subprocesses' instances and according to a low_threshold or a high_threshold (typically integers).

In operation 400 support may be initially set. Support may be, e.g. the minimum number of identical sequences of actions defining a subprocess found for the subprocess; if for a potential subprocess too few (below a support threshold) identical action sequences exist the subprocess is not identified or returned. Support may be initially set to be for example the total number of instances of (e.g. specific) actions for the context being analyzed, given as "LengthUnique", divided by an initial threshold. In operation 410, a process or algorithm for discovering sequential patterns in sequences, such as the known PrefixSpan algorithm, may be used on the low level actions for a given context, with support the currently set support (e.g. the minimum number of occurrences of a sequence for it to be returned as a subprocess). The variable context input to the algorithm may be the set of actions in a context. Typically, any division of actions into sentences, groups or time period is ignored in operation 410, and the ordering of actions may be based on timestamp. The list subProcesses may be returned being the set of subprocesses having minimum support. In operation 420 it may be determined if the number of subprocesses returned (length) is greater than MIN_LENGTH, a minimum length for the set of subprocesses returned. If the number of subprocesses is greater than MIN_LENGTH, in operation 430 the set of subprocesses is returned. If the number of subprocesses is not greater than MIN_LENGTH, support may be adjusted (operations 450 and 460) and the process or algorithm for discovering sequential patterns in sequences may be executed again. In operation 440 it is determined if length (the number of subprocesses returned in operation 410) is greater than a threshold LOW_LENGTH. If length>LOW_LENGTH in operation 450 support may be set to support (the current support) divided by a pre-set divisor high_threshold. If length<=LOW_LENGTH in operation 460 support may be set to support divided by a pre-set divisor low_threshold. After operation 450 or 460 is performed, operation 410 is performed again to discover sequential patterns with a newly calculated support.

Each user action may be described by or associated with a user action vector (e.g. an ordered list or series of numbers), for example an N dimensional vector, describing the action. Each subprocess may be described by or associated with a subprocess vector which may be generated from action vectors associated with low-level user actions which occur in the subprocess. An action vector for an action may be calculated or created for example a text string which is the generalized name for the action, where data related to a specific instance is removed or no considered. Text strings may be generalized using generalized names or tokens that represent entities such as person names, file names and ID numbers. An action vector may describe a relationship between an action and nearby (in a series of actions) or other actions. A string used to create an action vector may be a generalized name for the action, and/or may include the application name which executes the window in which the action is input or takes place, input type description for the action and screen window information such as the title of a screen window (e.g. "MyOrderingSystem-Login") in which the specific action occurred, calculating as the action vector a word embedding of the text string, for example using the Word2vec algorithm. A word embedding algorithm such as Word2vec when creating a vector for an action may consider two actions before and two actions after (when considering the actions as ordered by time stamp); this may be a parameter sent to Word2vec and may be changed in different embodiment. Other specific methods for creating the vectors may be used.

In one embodiment, data regarding an action may be used to create a text string or word as an input to a word embedding algorithm. For example, the low-level user action of entering a username may include the following example data (other data may be used):

Action time: 10:00:10
User details: Agent1
Action type: InputText
Window details:
   Application or application name: Internet Explorer
   Window Name: "MyOrderingSystem-Login"
   Action Component: Username
   Text that was submitted: "Agent1"

and may be associated with the following text string description summarizing the action's information by concatenating the action type+window details to form a general description of an instance of an action: "User InputText on Username in MyOrderingSystem-Login—iexplore". A text string input to a word embedding process may include other information such as action type, action component (e.g. the name of the input field in a window into which a user provides input by typing, clicking on, etc.). For example, when filling in an on-screen form, action components may denote or label the different form-fields (e.g., name, address, phone number, etc.), window details, and context associated with the action. The description may be considered the "word" representation of an action that may be an input, for example, to Word2vec. A result may be for example a vector representing the action, e.g. a vector including 200 numbers. Vectors associated with actions may be generated from the generalized or shared name or description of the action, and thus specific instances of actions that are similar may share the same vector. Subprocess vectors may be averages of action vectors where each set of instantiated actions that share a generalized identification contribute one vector to the average of a subprocess vector. Other methods of creating or averaging subprocess vectors may be used.

Each subprocess may be named; for example the name may be the context associated with the subprocess. In some embodiments, if multiple subprocesses are found for a context, the subprocess with the highest score may be chosen to represent that context and may be given the name of the context.

Subprocess' scores may be calculated for example by two scores or rankings that are multiplied together, using for example the following formula (other formulas may be used):

$$sub\_process\_score = norm\_quality\_score \cdot ROI\_score$$

Where the ROIscore may be a measure of how much time is spent on the subprocess (e.g. the total duration of all subprocess' instances), meaning, how much time could be saved by automating it. The time spent on the subprocess may be calculated by averaging over each specific instance (e.g. actual case) of the subprocess. The norm_quality_score may be a rating or measure of the "quality" in the automation context of the low level actions that make up the subprocess. Such norm_quality_score for each action type (not specific instance) may be predetermined or preset, and may associate a unique factor to each type of action according to its importance. For example a copy or paste action may have a high rating, and input text may have a middle level rating, and a mouse-click not involved in copy or paste or text entry may have a low rating. In some embodiments, the substance of input text is not used, rather only whether or not text is entered is used to create a score for a subprocess.

The norm_quality_score may be normalized, for example to a value between 1 and 1.5 so that the final score is mainly based on ROI score, where norm_quality_score counts only a certain amount, e.g. 50%, of the rating, due to its normalization. Other methods of determining a rating may be used.

In operation 330 processes may be detected, inferred or created, for example by clustering or grouping the subprocesses into processes such as user function processes or business processes. For example, if the following example subprocesses are identified:

a. Password reset
b. Secured password generation
c. Request to new password
d. New distribution list
e. Add to distribution list The subprocesses may be clustered into a first process including subprocesses a, b and c (e.g. related to "reset password" process); and a second process including subprocesses d and e (e.g. related to "distribution list" process). Embodiments of the invention may accurately cluster different subprocesses into processes given only a small amount information about them: reoccurring sequences of actions. In particularly, no a-priori knowledge may be available about the "processes-space". An embodiment may learn vector representations: first, for the input data of low-level actions, a vector is inferred for each subprocess according to the actions it contains. A vector representation of each action may be created for example using Word2vec techniques. Then a vector representation may be created for each subprocess for example by averaging the vector representations of its included actions.

In one embodiment, clustering or grouping is performed by analyzing subprocesses across or for all contexts (e.g. subprocesses associated with any context), as opposed to subprocess detection, which in some embodiments may be performed for or within each context, for the actions within the context. Subprocess vectors may be clustered (e.g. by calculating a distance between subprocesses and then using an algorithm such as the known Louvain method algorithm) to represent, create or define tasks or processes such as business processes. Processes may be named for example based on the names of subprocesses with the process.

A distance between each pair of vectors may be created or calculated, and that distance may be used to cluster vectors. To calculate a distance between two subprocesses $S_1$, $S_2$ each represented by vectors $\vec{S_1}$ and $\vec{S_2}$ (e.g. the vector representation of each subprocess after for example a Word2vec or other process, such as a word embedding) a formula such as the following may be used:

$$dist(S_1, S_2) = p_1 \cdot |\vec{S_1} - \vec{S_2}| + p_2 \cdot \frac{|S_1 \cap S_2|}{|S_1 \cup S_2|}$$

Where:
$|\vec{S_1} - \vec{S_2}|$ means the Euclidean distance between the two vectors;
$S_1$ and $S_2$ denote the "sequence" representation of each subprocess, namely, as a list of actions (e.g., [a,b,c,d] where each letter denotes some low-level user action). The list may be ordered, e.g. by timestamp, although ordering is not considered in the example distance calculation provided.

$$\frac{|S_1 \cap S_2|}{|S_1 \cup S_2|}$$

means the similarity ratio between the two lists:

$|S_1 \cap S_2|$ is the number of actions (generalized descriptions of actions, not specific instances of action) in their intersection, e.g., the number of actions which are shared by both lists (where cardinality is denoted by vertical lines);

$|S_1 \cup S_2|$ is the number of generalized actions in their union.

For example, for actions a, b, c, d, assume subprocess $S_1$=[a, b, c] and subprocess $S_2$=[a, d]:

$|S_1 \cap S_2|=|\{a\}|=1$ as only action {a} is shared by both lists;
$|S_1 \cup S_2|=|\{a,b,c,d\}|=4$ as their union size is 4 actions {a,b,c,d};

Thus, in this example, $$\frac{|S_1 \cap S_2|}{|S_1 \cup S_2|} = \frac{1}{4}$$

Clustering may then be performed using the distances calculated. Each subprocess may be associated with a cluster such that subprocesses related to the same process (e.g. business process) are associated to the same cluster. This may be performed for example using a Louvain method for community detection which may find or determine clusters by maximizing the graph's modularity. Other suitable clustering or community detection methods may be used. Each subgroup may be initially set or seeded as a cluster. A calculation may be iteratively or repeatedly performed such that in each iteration or repetition, for each cluster, a modularity may be calculated for the cluster to determine which cluster maximizes the modularity of the graph of clusters. To calculate modularity, the following example formula may be used (as with other formulas herein, other suitable formulas may be used):

$$Q = \frac{1}{M}\sum \left[dist(S_i, S_j) - \frac{k_i k_j}{M}\right] \cdot \delta(c_i, c_j)$$

The modularity Q for two subgroups may be defined as a value between −1 and 1, representing the density of the links within the clusters versus the links between the clusters. $k_i$ is distances' sum of the i-th subprocess, e.g., the sum of its distances to the rest of subprocesses. $c_i$ may be a number representing the ID of the cluster associated with subprocess $S_i$. $\delta$ may be an equalization or delta function for two clusters, resulting in a binary output, 1 or 0. Thus $\delta$ operates to return an individual distance only if $S_i$, $S_j$ are in the same cluster; otherwise the distance is zero. $M=\Sigma k_i$.

The optimal modularity may be for example the best partition of a given graph into clusters. Iterating over all possible partitions is not practical, instead, an embodiment using the Louvain method may approximate this by an iterative finding of smaller clusters: in each iteration, each node (i.e., subprocess) is associated with its cluster. Then, for each node i, the change in modularity is calculated using the formula provided above, for removing the node from its cluster and associating it instead with each of the other clusters. Finally, the i-th node is associated with or moved to the cluster that maximizes the modularity. In this way, the Louvain method assures the modularity's maximization.

Such a process, iterating over all subgroups i, may itself be iterated until a stopping point. The modularity formula above may be iterated over a number of iterations, where within each iteration, for each subprocess, modularity is calculated for that subprocess in its current cluster and moved to other clusters, moving the subprocess to increase modularity if possible.

Processes may be named. For example, the process name may be derived by the most common words in its subprocesses' names. E.g. in the case for three subprocess names (which may also be context names): -subprocess 1 name: "new participant search"; -subprocess 2 name: "new participant filling"; -subprocess 3 name: "new participant printing summary" the process name may be: "new participant".

In operation 340, for each process, the process structure, or order of subprocesses within each process may be found; e.g. processes may be ordered (which typically occurs before process scoring). While action data may include timestamp information, the actual timestamp data may not properly reflect the start and end times of the subprocesses, and thus the order of subprocesses may need to be inferred by another method. This may be created for example using a maximum likelihood estimator which may, for a subprocess, identify or determine the probability that it comes before or after another subprocess. This may be performed using for example timestamp data and user or agent ID data. In one embodiment, each subprocess may be stored with a pointer or link to all of its instances (e.g., executions found in the data, such as actions), in particular to the IDs of each action as part of every execution of the subprocess. The timestamp data can be then gathered or inferred from the actions stored, according to the action IDs.

For a certain process having a certain set of subprocess, all actions within each subprocess may be analyzed, and for some of those subprocesses the action timestamps may, for the same agent, have timestamps indicating an action is before a second action, and others may indicate the action is after the second action. In other words, the timestamp data may not clearly indicate an ordering across subprocesses.

For example, the three subprocesses depicted in FIG. 3 (get new order, handle order, finalize order) may be clustered into a process but not yet ordered as depicted in FIG. 3 (the order being 1) get new order→2) handle order→3) finalize order). Typically, this is done within each cluster, not across clusters: e.g. for each cluster an ordering (typically a likely ordering) of the subprocesses within the cluster is identified or determined. An embodiment may be based on a probabilistic estimator estimating the transition probability between each sample pair of subprocesses within the cluster and inferring the maximum likelihood process structure. E.g., in the example of FIG. 3 such an embodiment would learn that the probability of A being before B (Prob(A→B)) is much higher than Prob(B→A), etc. An embodiment of such an estimator may considers various information about the subprocesses instances such as agent names, execution times, etc. and may associate a "transition probability" with every pair of subprocesses. A formula such as the following may be used to perform a maximum likelihood estimator process, with the formula between the first and second "=" signs being a restatement for explanatory purposes:

$$Prob(S_1 \rightarrow S_2) =$$

$$Prob(\text{instance } s \text{ continued to some instance in } S_2 | s \in S_1) ==$$

$$\frac{\sum_{s \in S_1} \text{instance } s \text{ continued to some instance in } S_2}{\text{\# instances in } S_1}$$

Prob($S_1 \rightarrow S_2$) indicates the probability or likelihood that instances "s" of (within the set of all instances of) subprocess S_1 continued to S_2, such that there is some instance in S_2 which is a continuation of their execution. This may be measured by the sum of all instances s of the set of instances S_1 of a subprocess where instance s actually was directly followed by any instance within S_2; this is then divided by the number of instances in S_1. The formula may measure for each specific actual instance of two subprocesses the probability the individual entering input to carry out the subprocesses from the first to the second subprocess. Some specific instances may indicate a probability the opposite of the final answer Prob, and thus typically all or many such available instances are input. From these probabilities the most likely ordered path may be created. Probabilities of an order or sequence within each pair of subprocesses may be created, where a subprocesses is a member of multiple pairs having probabilities created. From this knowledge, pairs themselves may be ordered, as the probability of a transition between the later member of each pair to the earlier member of a different pair may be known. Thus the pairs may be assembled into an ordered sequence which is the process.

In operation 350, enriching operations may take place. For example an automation score or rating may be or calculated created for each identified process, which may for example indicate the value or ROI potential of automating the identified processes, or the importance of the process for automation. Such a score or rating may be based on actions which make up the process, the cumulative time spent for each subprocess (e.g. duration in which a user completes the process) making up the process and/or a quality score for each low-level user actions making up the subprocesses which in turn make up the process. A higher score may indicate a process whose automation is more valuable (given the cost to create an automatic process); conversely a low score may signal that the process may be less valuable process for automation.

In one embodiment a rating or score may be calculated by averaging the scores of each subprocess associated with it:

$$process\_score = \frac{\sum sub\_process\_score}{\text{\# sub\_processes}}$$

Subprocess' scores may be calculated as described above, for example by two scores or rankings such as an ROI score measuring, for example, time spent on a subprocess and a normalized quality score.

In operation 360, a visualization, graph, or report may be created and provided to a user depicting, for example, identified processes, and associated scores and other information.

In operation 370, an automation of a process or part of a process may be created based on the information gathered and created in prior operations. For example, a process may have been discovered in the operations above for adding a participant (e.g. a person, a customer) to a plan which may be automated by a bot which interacts with the relevant computer system as would a human agent: an agent may have searched (e.g. a database, a customer system) for a participant, entered or filled in the new participant details, and then performed a printing and finishing task. Such a bot may be executed for example by server 20 or agent terminals 2. A process may have been discovered in the operations above for a "printing and finishing" subprocess and may be turned into a bot: an agent is required to click (e.g. using a mouse, which must be moved to the correct screen portion for each operation) a print button, select using the mouse and e.g., a drop-down menu a type of print (e.g. to .pdf, to a certain printer), click print, then perform operations to save or copy the printed result to a certain place. Another example of automation that may be discovered and created includes a process where an agent may receive a list of accounts to open. The agent enters information from the list, then may need to print a screen showing the account opening, and save the printscreen image to a file for documentation. This process may be discovered or identified by embodiments of the present invention, and a bot or other automatic process may be created.

The operations of FIG. 2 are examples only, and different operations may occur in different embodiments.

FIG. 5 is an example of information collected and assigned to a subprocess according to embodiments of the present invention. The information may be presented for the actual human agent executing the actions presented (e.g. user ID "User 1"). The example information depicted in FIG. 5 may be displayed to a user and shows, for the process of adding a participant, the actions which are included in the subprocess "nrs workflow . . . participant search". The Action column 510 includes actions 512, each with a start time 522 in start time column 520. Each action includes in an Action Component column 530 including action components 532 (e.g. the name of the input field in a window into which an action applies input); Window column 540 including the titles or names 542 of the window used for each action; application column 550 including the program or application 552 used to execute the window; and text column 560 may include items of text entered 562 if any.

Figure 6:
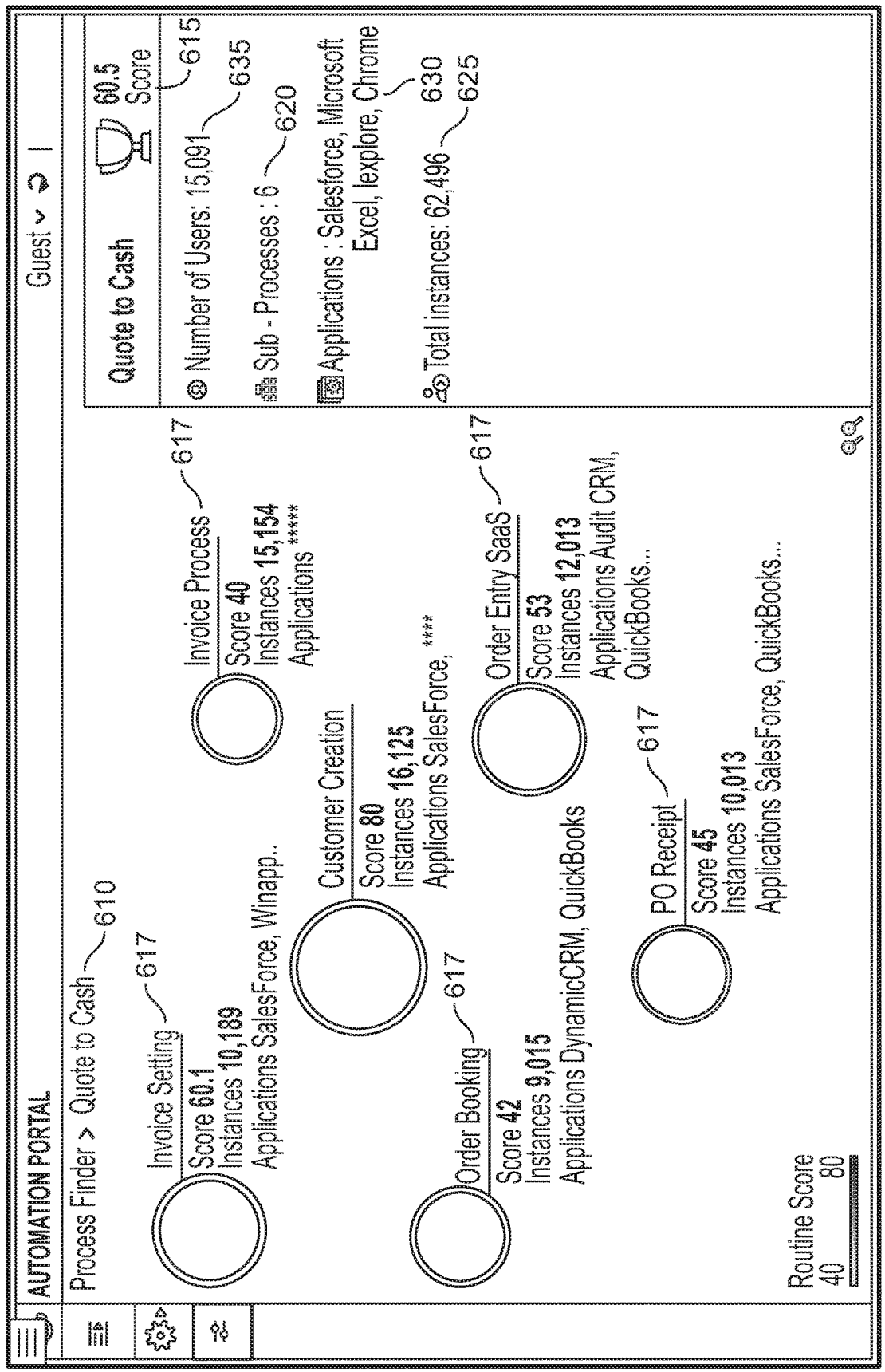
FIG. 6 is an example of information provided in a visualization according to embodiments of the present invention.

FIG. 6 is an example of information provided in a visualization according to embodiments of the present invention. In one embodiment a display or screen such as that of FIG. 6 may be presented to a user to provide the user a quick and complete understating of the most significant automation opportunities. Via such a display (as well as the further drilled-down screens), the user may learn details and analytics of automation opportunities and may obtain an effective business-oriented decision (e.g. in terms of profitability and automation ROI potential) regarding which processes to automate using robotic processing. This may be an improvement over identifying opportunities on a manual basis which can easily miss more significant flows and may be biased, time consuming and expensive. In FIG. 6, a display may provide a process name 610, a process score or rating 615 (e.g. an automation score or rating), subprocesses 617 (including associated data such as an ROI score, number of specific instances in input data, and applications used), a number 620 of subprocesses associated with the process, a total number of occurrences or instances 625 (e.g. the number of times the process appeared in input data), the applications used 630 (e.g. the names of applications used in the process such as the Internet Explorer browser, the Chrome browser, etc.), and a number of users 635 (e.g. the number of different users that executed the process in input data). A user may click on or select a subprocess 617 to cause display of details regarding that subprocess ("drilling down").

Figure 7:
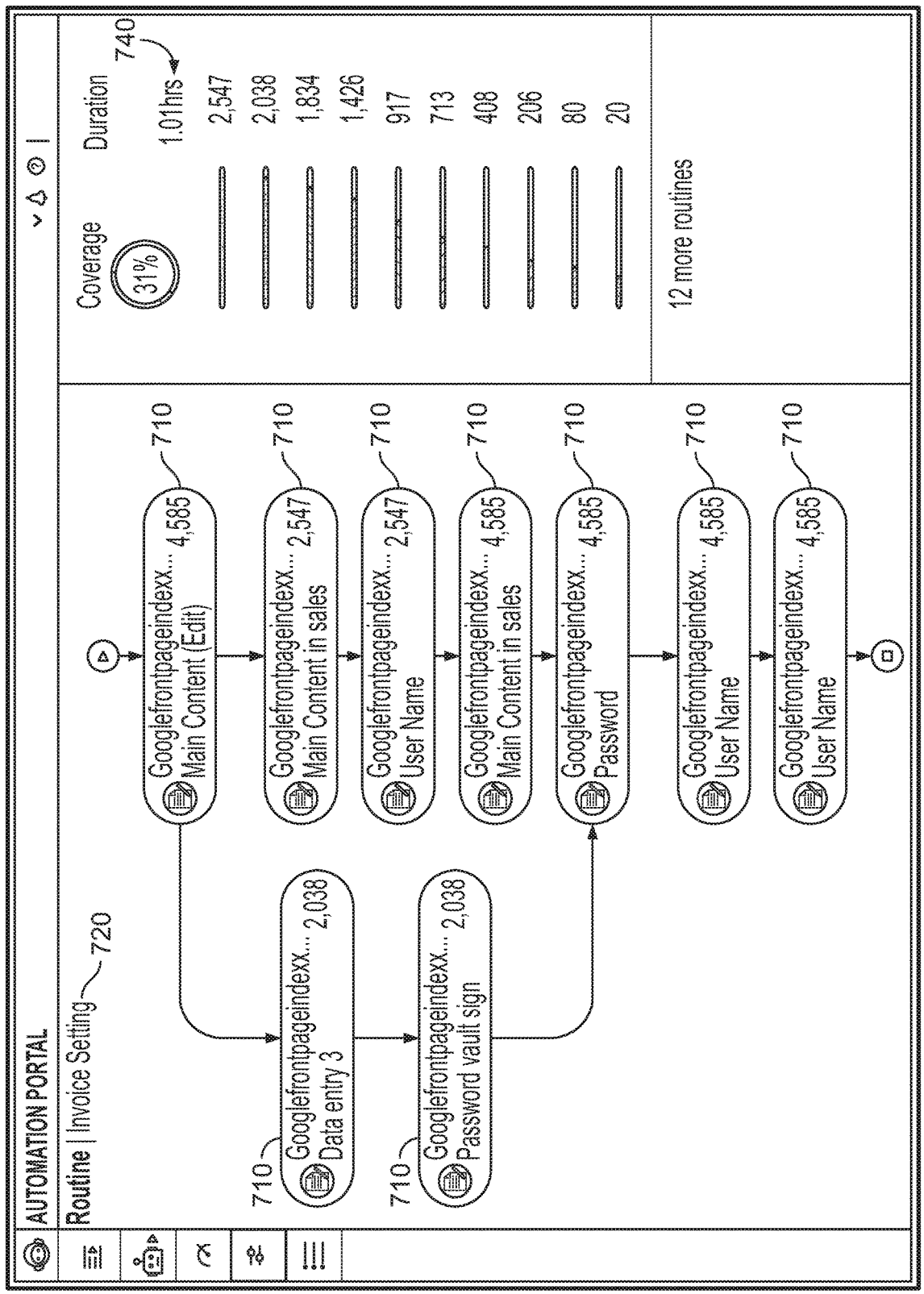
FIG. 7 is an example of information provided in a visualization according to embodiments of the present invention.

FIG. 7 is an example of information provided in a visualization according to embodiments of the present invention. FIG. 7 depicts sample information on a subprocess, which may be accessed for example if a system receives a user click or other information on a subprocess as shown in FIG. 6. A display such as FIG. 7 may provide a view of a subprocess as a breakdown to its low-level user actions 710; as well as information such as for example, a subprocess name 720; a subprocess score or rating; and total duration 740 of the subprocess (which may be for example the total duration across all specific instances of the subprocess; e.g. the sum of all instances' durations).

Embodiments of the invention may improve the technologies of computer automation, big data analysis, and computer use and automation analysis. Existing technologies and non-technology based techniques to analyze computer use data to identify or determine automation opportunities suffer from numerous drawbacks, as explained elsewhere herein. For example, existing technologies are not capable of using low-level desktop events as input data. A human attempting to perform such an analysis would be faced with an unreasonably large amount of data. This is, as a practical matter, impossible to be performed by a human. Embodiments of the present invention may include a practical application of a series of algorithms which result in detection of computer processes which may be automated and the implementation and creation of computer automation processes. Some embodiments may be agnostic to the domain (e.g. the platform and specific programs as well as customer type, segment market, etc.) and language used for user interfaces, or other data, and may work with any data, for any specific programs the user interfaces with.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for analyzing computer actions on a computer desktop system to identify computer-based processes which are automation candidates, the method comprising using one or more computers:
    using a data gathering process executed by a processor on a computer of the one or more computers, gathering low-level user action computer information items describing user input to the computer, each low-level user action computer information item comprising an input type description, a user name of the person inputting the user action, and screen window information;
and at a computer of the one or more computers:
    applying sequential pattern mining to determine a set of subprocesses; each subprocess comprising a series of low-level user actions, each user action associated with a user action vector, and each subprocess associated with a subprocess vector generated from user action vectors associated with low-level user actions comprised in the subprocess;
    clustering the subprocess vectors to create a new plurality of processes;
    grouping the new plurality of processes using contexts using a TF-IDF (term frequency-Inverse document frequency) learning algorithm;
    using the learning algorithm, continuously updating the new plurality processes for each low-level user actions;
    for each of the new plurality of processes, calculating an automation score using the actions comprised in the subprocesses comprised in the process;
    determining, using a PrefixSpan algorithm, whether the automation score of the new plurality of processes has passed a support threshold;
    once a support threshold has been passed, creating an automation bot through a remote server, wherein the automation bot automatically performs the new process within the plurality of new processes, by replacing the low-level user actions in the new process with automated bot actions.

2. The method of claim 1, wherein calculating an automation score for a process is based on the time spent for each subprocess comprised in the process and a quality score for each low-level user action comprised in each subprocess comprised in the process.

3. The method of claim 1, comprising creating a user action vector by:
    creating a text string from at least the input type description, the name of the application executing the screen window, and the screen window information; and
    calculating as the user action vector a word embedding of the text string.

4. The method of claim 1 comprising displaying a visualization for a process including the automation score.

5. The method of claim 1 wherein calculating an automation score is performed using a duration for the process.

6. The method of claim 1 comprising ordering subprocesses using a maximum likelihood estimator.

7. A method for identifying automation candidates on a computer desktop system, the method comprising:

using a data gathering process executed by a processor on a computer of the one or more computers, gathering low-level user action computer information items describing user input to the computer, each low-level user action computer information item comprising an input type description, a user name of the person inputting the user action, and screen window information;

and at a computer of the one or more computers:

applying sequential pattern mining to determine a set of subprocesses, each subprocess comprising a series of low-level user actions, each user action associated with a user action vector, and each subprocess associated with a subprocess vector generated from user action vectors associated with low-level user actions comprised in the subprocess;

clustering the subprocess vectors to create a new plurality of processes;

grouping the new plurality of processes using contexts using a TF-IDF (term frequency-inverse document frequency) learning algorithm;

using the learning algorithm, continuously updating the new plurality processes for each low-level user actions;

for each of the new plurality of processes, calculating an automation score using the actions comprised in the subprocesses comprised in the process;

determining, using a PrefixSpan algorithm, whether the automation score of the new plurality of processes has passed a support threshold;

once a support threshold has been passed, creating an automation bot through a remote server, wherein the automation bot automatically performs the new process within the plurality of new processes, by replacing the low-level user actions in the new process with automated bot actions.

8. The method of claim 7, wherein calculating an automation score for a process is based on the time spent for each subprocess comprised in the process and a quality score for each low-level user action comprised in each subprocess comprised in the process.

9. The method of claim 7, comprising creating a user action vector by:

creating a text string from at least the input type description, the name of the application executing the screen window, and the window information; and calculating as the user action vector a word embedding of the text string.

10. The method of claim 7 comprising displaying a visualization for a process including the score.

11. The method of claim 7 comprising ordering subprocesses using a maximum likelihood estimator.

12. A system for analyzing computer actions on a computer desktop system to identify computer-based processes which are automation candidates, the system comprising:

using a data gathering process executed by a processor on a computer of the one or more computers, gathering low-level user action computer information items describing user input to the computer, each low-level user action computer information item comprising an input type description, a user name of the person inputting the user action, and screen window information;

and at a computer of the one or more computers:

applying sequential pattern mining to determine a set of subprocesses, each subprocess comprising a series of low-level user actions, each user action associated with a user action vector, and each subprocess associated with a subprocess vector generated from user action vectors associated with low-level user actions comprised in the subprocess;

clustering the subprocess vectors to create a new plurality of processes;

grouping the new plurality of processes using contexts using a TF-IDF (term frequency-inverse document frequency) learning algorithm;

using the learning algorithm, continuously updating the new plurality processes for each low-level user actions;

for each of the new plurality of processes, calculating an automation score using the actions comprised in the subprocesses comprised in the process;

determining, using a PrefixSpan algorithm, whether the automation score of the new plurality of processes has passed a support threshold;

once a support threshold has been passed, creating an automation bot through a remote server, wherein the automation bot automatically performs the new process within the plurality of new processes, by replacing the low-level user actions in the new process with automated bot actions.

13. The system of claim 12, wherein the second processor is configured to calculate an automation score for a process is based on the time spent for each subprocess comprised in the process and a quality score for each low-level user action comprised in each subprocess comprised in the process.

14. The system of claim 12, wherein the second processor is configured to create a user action vector by:

creating a text string from at least the input type description, the name of the application executing the screen window, and the screen window information; and calculating as the user action vector a word embedding of the text string.

15. The system of claim 12, wherein the second processor is configured to display a visualization for a process including the automation score.

16. The system of claim 12, wherein calculating an automation score is performed using a duration for the process.

17. The system of claim 12, wherein the second processor is configured to order subprocesses using a maximum likelihood estimator.

18. The method of claim 4 wherein the visualization for a process comprises a set of subprocesses, each subprocess displayed with a window associated with the subprocess and an application associated with the window.

19. The method of claim 4 wherein the visualization for a process comprises a number of instances for the process.

20. The method of claim 1, wherein each series of low-level user actions has is a minimum number of occurrences in the gathered low-level user action computer information items.

21. The method of claim 1, wherein the sequential pattern mining iteratively finds series of increasing length.

22. The method of claim 1, wherein the screen window information is the name of the screen owned by the application to which the user inputs the user action.

* * * * *